June 24, 1941.　　　A. L. RICHE　　　2,246,756
CONTROL APPARATUS
Filed July 12, 1939　　　2 Sheets-Sheet 1

Inventor:
ARTHUR L. RICHE
By Karl H. Sommermeyer
Atty.

June 24, 1941.  A. L. RICHE  2,246,756
CONTROL APPARATUS
Filed July 12, 1939  2 Sheets-Sheet 2
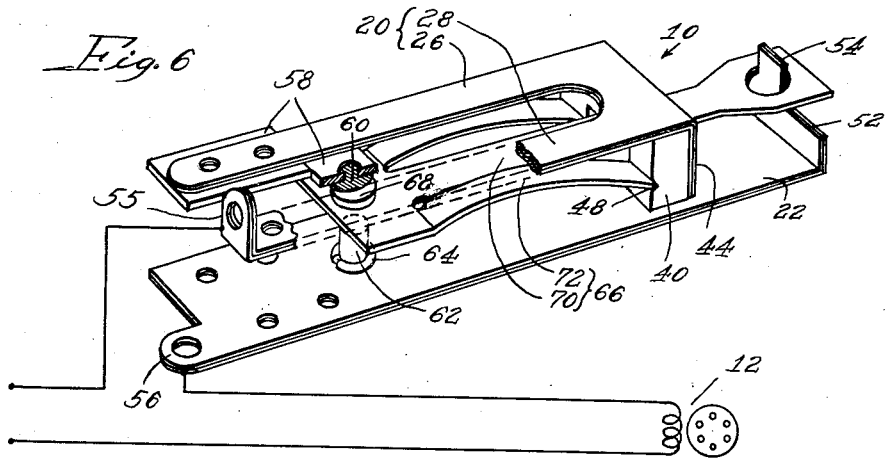
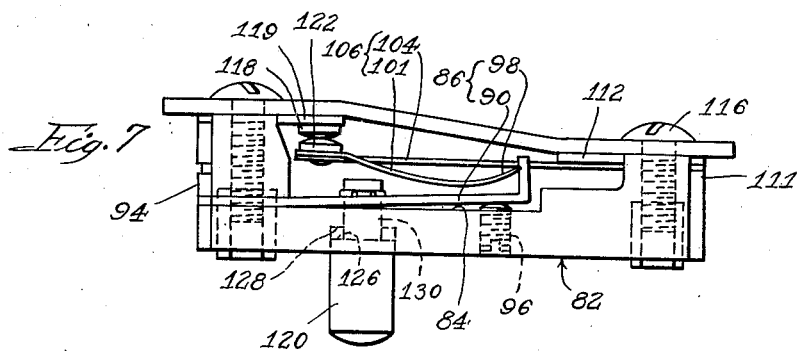
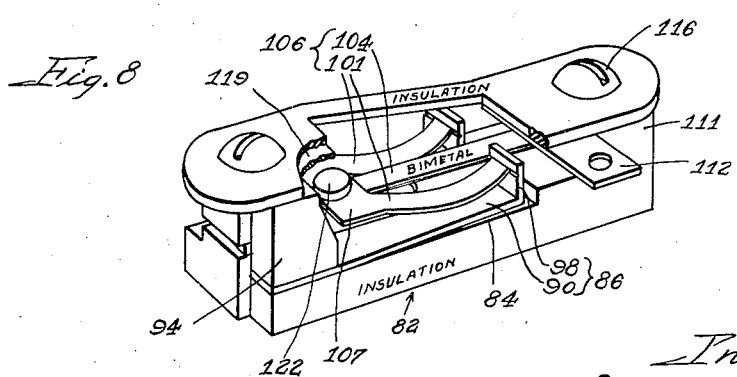
Inventor:
ARTHUR L. RICHE
By Karl H. Sommermeyer
Atty.

Patented June 24, 1941

2,246,756

UNITED STATES PATENT OFFICE 2,246,756

CONTROL APPARATUS

Arthur L. Riche, Freeport, Ill., assignor to Micro Switch Corporation, Freeport, Ill., a corporation of Illinois Application July 12, 1939, Serial No. 283,958
In Great Britain February 28, 1938

9 Claims. (Cl. 200—138)

The present invention relates generally to temperature responsive control apparatus, and more particularly to thermally actuated protective devices for power translating apparatus such as electric motors and the like.

This application is a continuation in part of my application Serial No. 128,206, filed February 27, 1937, now Patent 2,189,996, granted February 13, 1940.

Objects of the invention include the provision of a simplified and improved trip-free protective device, an improved snap acting manual reset thermostat, and an improved protective device for electric motors and the like. The invention resides in certain novel features of construction, combinations of parts and arrangements of apparatus, and is illustrated by the certain specific embodiments herein shown and described by way of example. In the drawings:

Fig. 6 is a schematic view showing the control apparatus in skeleton perspective partly broken away, and showing diagrammatically one manner in which it may be connected to an electric motor for controlling its operation;

Fig. 7 is an elevation of a modified apparatus of the invention; and,

Fig. 8 is a perspective view of the device of Fig. 7, partly broken away.

Figure 1:
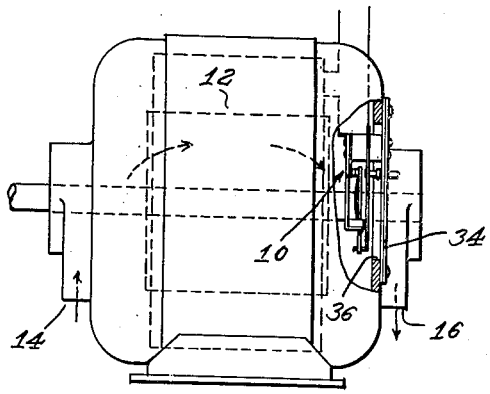
Fig. 1 is a side view partly broken away of an electric motor with the control apparatus of this invention mounted therein.

The control apparatus or thermally actuated protective device, indicated generally by the reference numeral 10 is shown in Fig. 1 mounted in an electric motor 12 so as to be exposed to the heat within the enclosing frame of the motor. This particular motor 12 draws air through an inlet opening 14 into the end bell at its left end as seen in Fig. 1, circulates the air over the heated parts of the motor and exhausts it from the right end bell out through the exhaust opening 16. The thermal protector 10 is located in the right end bell at the exit end.

Figure 2:
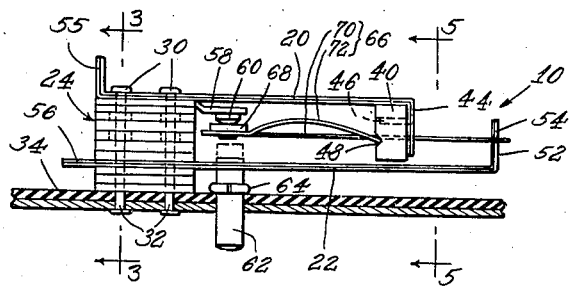
Fig. 2 is a side view of the control apparatus of this invention.
Figure 3:
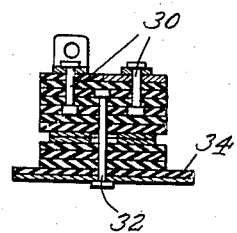
Fig. 3 is a sectional view along the lines 3—3 of Fig. 2.
Figure 4:
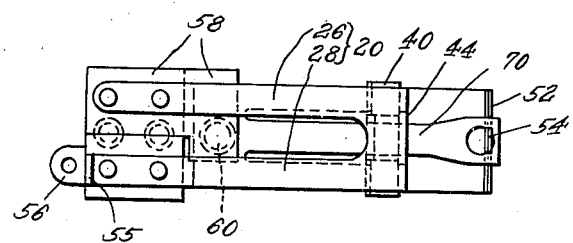
Fig. 4 is a plan view of the control apparatus.
Figure 5:
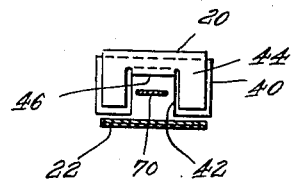
Fig. 5 is a fragmentary sectional view along the lines 5—5 of Fig. 2.

As may be seen in Figs. 2 and 3, the protective device includes two thin arms 20 and 22 of thermostatic bimetal, mounted at one end thereof upon an insulating stack or supporting structure 24. These two arms 20 and 22 lie approximately parallel to each other and extend in the same direction from the insulating stack 24. Arm 20 comprises two fingers or branches 26 and 28 which are joined at the free or unsupported ends thereof as shown in Figs. 4 and 6. The supporting structure 24 consists of a plurality of sheets of insulating material held together by metal rivets 30 and 32 (see Fig. 3) which are so arranged that the arms 20 and 22 are kept thermally and electrically insulated from each other. The rivets 32 also support the mounting stack on an insulating mounting plate 34 which when mounted on the motor as shown in Fig. 1 closes an opening 36 in the end bell and supports the thermal apparatus within the motor housing. Both of the arms 20 and 22 are shown to have substantially the same width and thickness, but their dimensions may be varied as desired. Arm 20 is somewhat shorter than arm 22 and carries a block of insulating material 40 at its free end. The block is provided with a slot 42 (see Fig. 5). The end portion 44 of the arm 20 is bent at a right angle towards the arm 22 and this bent portion lies against the rearward surface of the block. A tongue of metal 46 cut from this bent over end 44 of arm 20 is bent toward the support 24 and extends into the slot 42 in the block 40 where it fits tightly to hold the block 40 firmly in place. This block 40 carries a notch 48 (shown in Figs. 2 and 6) in its forward face (its surface facing the supporting stack 24) for a purpose which will be explained presently.

Arm 22 is solid and has its free end portion 52 bent substantially at a right angle toward the arm 20. The extreme end 54 of the end portion 52 has its width reduced and is provided with a notch on its outermost face. Arms 20 and 22 both have perforated end portions 55 and 56 projecting from the insulating mounting stack 24 as seen in Figs. 2 and 6 to serve as terminals for making electrical connections to the conductors supplying current to the motor.

A metal contact carrying plate 58 is mounted on the insulating stack 24 and is clamped under the finger 26 of arm 20, by rivets 32. This terminal plate extends out from the supporting stack 24 in the same direction as arms 20 and 22, (toward the right as seen in Fig. 2) but extends only a relatively short distance, and at its free end carries a stationary electric contact 60.

A manually operable push rod 62 slides in alined holes provided in the thermostatic bimetal strip 22 and the mounting plate 34 and is held in place by a wire clip 64 which fits in a groove in the push rod and abuts against the strip 20 and mounting plate 34 to restrict the motion of the rod 62. One end of this rod 62 opposes the stationary electric contact 60, and the rod 62 and contact 60 together constitute stops for a snap acting electric switch mechanism to be described presently.

A movable switch member 66 composed of thin spring metal carries an electric contact 68 which moves with a snap action between the stationary contact 60 and the manual push button 62. This spring member 66 includes a relatively long central tension strip 70 which lies within the slot 42 in the insulating block 40 and hooks over the end 54 of the bimetal strip 22, and includes also two relatively short bowed compression strips 72 which pivotally engage the notch 48 in the insulating block 40 carried by the end 44 of bimetal strip 20. All of these compression and tension strips of the snap acting spring 66 are joined together at their extreme left end as seen in Fig. 2, at which end they carry the moving contact 68. These tension and compression strips respectively articulate about their supports on the bimetal strips 20 and 22, and since the compression strips 72 have a shorter radius of action, that is a shorter distance to their movable or contact end, the spring 66 constitutes a snap acting toggle which executes an overcenter snap action. A movement of the bimetal strips to carry the pivot axis of the compression spring 72 across the tension center line of the central tension spring 70 causes the spring toggle to carry the moving contact 68 with a snap action from one of its stops to the other.

Normally when the bimetal strips 20 and 22 are cold or at ordinary room temperature, the axis of the pivotal support of the two compression strips 72 in the notch 48 lies below the tension center line of the tension strip 70 so that the spring toggle 66 normally holds the movable contact 68 in its uppermost position in engagement with the stationary contact 60 to close the power circuit to the windings of the motor. When either of the bimetal strips 20 and 22 is heated it moves in a direction away from the other, and the resultant relative movement of these two strips 20 and 22 carries the pivot axis of the compression spring 72 up through the tension center line of the tension spring 70 to reverse the direction of the toggle action so that the spring toggle 66 snaps the moving contact 68 down away from the stationary contact 60 and into engagement with the manual reset button 62 which serves as a stop. The retaining clip 64 on this manual reset button 62 is so located that when the button 62 is released, and falls to its lowermost or normal position, it permits the moving contact 68 to move so far down that it cannot automatically return to its uppermost position even though the bimetal strips 20 and 22 be cooled. In fact it is impossible to cause the contacts to return to its normal upper position merely by cooling of the bimetal strips, because if they are cooled materially below room temperature, the block 40 carried by the strip 20 abuts against the strip 22 to prevent their moving farther in response to continued cooling. After the bimetal strip 20 and 22 have been cooled through a predetermined temperature, the push button may be moved manually to its uppermost position, and from the position to which the contact 68 is raised by this motion of the manual reset button 62, the spring toggle will snap the contact 68 into the upper position against the stationary contact 60 to reclose the circuit. The uppermost position of the manual reset button, as determined by the spring clip is so chosen that the manual button can carry the contacts only up to a position such that even though the push button be manually held in its uppermost position, the two stops provided by this manual push button and the stationary contacts still allow a considerable movement of the snap acting spring. This minimum value to which the motion of contact 68 can be restricted by the reset push button 62 imposes a minimum value on the difference between the turn-on and turn-off temperatures of the complete thermostat. Since the push button 62 is limited in its upward motion by the clip 64, and so cannot force the contacts 68 and 60 into engagement, the bimetal elements must cool below the trip temperature (by an amount determined in part by the spacing between contact 60 and stop 62) to actuate the contacts to the closed position. Consequently, actuation of the manual push button 62 can reclose the circuit only if the bimetal elements have cooled below their "trip temperature," that is, below their "contact opening" temperature.

I am aware that there have been provided heretofore, snap acting thermostats which would not return automatically to their closed positions upon being cooled to room temperature, but would require a manual resetting action. My present invention provides two distinct improvements over such prior devices. First, in the absence of manual intervention, the device of my present invention will not reclose its circuit automatically no matter how low the temperature is carried and second, even in the case of manual intervention it will not reclose the circuit until the temperature drops to a predetermined low value, such as for example, room temperature.

Fig. 6 shows diagrammatically the circuit connections of the electric motor 12 and the thermal protective device 10. The circuit through the thermostatic protector 10 may be traced as follows: from the terminal 55, through legs 28 and 26 of the U-shaped bimetal strip 20, contact support 58, stationary contact 60, movable contact 68, tension member 70 of the toggle spring 66, to the bimetal strip 22 and its terminal 56.

The bimetal strip 22 may have a low electrical resistance so as to exhibit little or no response to the electric current traversing it, so that it responds primarily to the temperature of the motor 12 itself (see Fig. 1) and to the air within the motor housing. Bimetal element 20 may have a considerably higher electrical resistance than the element 22 so as to exhibit a substantial thermal response to the electric current, and furthermore may exhibit a smaller deflection per unit temperature change than the bimetal element 22 so as to be comparatively unresponsive to the heat of the motor as such. The bimetal element 20 will be heated by the current traversing it to a temperature above that of the air within the motor housing. The present device responds to over-current and to overtemperature of the motor to open the circuit and de-energize the motor to protect it from burnout, or other damage from excessive heating.

In certain types of installations it is desirable that the protective device having opened the circuit, should not automatically reconnect the motor to the line after it cools, as for example in an installation where the very occurrence of an overload on the motor indicates an abnormal condition that requires correction. The present device not only holds the circuit open after cooling to normal temperature, but also maintains the circuit open regardless of any abnormally low temperature to which the thermal device may be cooled, because the two thermal elements in abutting against each other prevent themselves from responding to such excessively low temperatures.

It is desirable also, for the protection of the motor itself, that the protective device should be incapable of closing the circuit, even in the case of manual intervention, until the motor has cooled considerably below the abnormal temperature condition at which it was disconnected from the line by the protector. The present device requires the actual reclosing of the circuit to be effected by the cooling of the thermal actuator and so requires both cooling and also manual intervention for "resetting" the device to reclose the circuit. Accordingly, the operator is prevented from restarting an overheated machine until it cools to a safe temperature.

Figs. 7 and 8 illustrate a thermal protector of somewhat different construction. An insulating base 82 includes a bed portion 84 which carries an anchor 86 formed of sheet brass. This anchor has a pair of legs 90 (of which only one appears clearly in the perspective view of Fig. 8) which are clamped under a molded insulated block 94 against the bed portion 84 of insulating base 82. This anchor 86 being thus held at only its left end (as seen in Fig. 7) may be flexed to raise and lower the other end. A screw 96 shown in Fig. 7 threaded into the base 82 turns up against the right hand end of the anchor 86 to raise it slightly off the bed portion 84 of the base 82 to adjust the operating point or operating temperature of the device.

The right hand end of the anchor 86 has two upturned tabs 98 which are notched to receive the ends of a pair of bowed thin compression springs 101, which are flat in their unstressed condition, and which constitute different portions of a single U-shaped spring (see Fig. 8). At the closed end 102 of this U-shaped spring, is riveted one end of bimetal strip 104, the other end of which is clamped to the raised portion 111 of the base 82 by a screw 116. A terminal member 112 provides an electrical connection to the mounted end of the bimetal strip 104.

The bimetal element 104 constitutes a tension member or thin leaf tension spring, and the springs 101, together with the bimetal element 104 constitute a snap acting toggle 106 which carries contact 122 at its movable end. A stationary contact 118 (shown only in Fig. 7) carried by terminal 119 clamped on top the insulating block 94, and a movable reset button 120, serve as stops to limit the snap movement of the toggle 106. The toggle 106 has an overcentered snap characteristic which makes it move with a snap action from one of its stops to the other in response to temperature change of the bimetal tension strip 104. The bimetal element 104 is arranged with its high expansion material on its upper face, so that upon a rise in temperature the bimetal tends to carry the contact 122 down and so causes the toggle 106 to snap the contact 122 away from the stationary contact 118 to open the circuit in response to a rise of temperature and similarly tends to cause the toggle to close the circuit in response to a fall in temperature.

The reset button 120 has a shoulder portion 126 which, when the button 120 is moved to its uppermost position, abuts against the counter-bored surface 128 in the hole in the insulating base 82, to limit the upward motion of the button 120. The length of the shank 130 of this reset button 120 is as chosen that when the button 120 is in its uppermost position with the surfaces 126 and 128 abutting, it will be unable to hold the movable contact 122 in engagement with the stationary contact 118. In other words with the button 120 so held in its uppermost position, the toggle 106 is still free to snap the moving contact 122 down to open the circuit. The length of the shank is further so chosen that the toggle when stopping against the movable reset button 120 will snap back to its uppermost position in response to the cooling of the motor.

The number of degrees difference between the two temperatures at which the bimetal element snaps respectively up and down (assuming the reset button 120 to be held in its uppermost position) is determined in part by the spacing between the two stops so provided for the toggle, compared to the dimensions of the compression springs 101 and the bimetal tension element 104 themselves. An adjustment of screw 86 to alter the position of the mounting points of the two compression springs 101 merely raises or lowers the two operating temperatures together without substantially changing the difference between those two temperatures. In practice the screw 86 may be adjusted to set the temperature at which the toggle snaps to open the circuit, (the trip temperature of the thermostatic protector) and the spacing between the stationary contact 118 and the base of the reset button 120 (when that button is in its uppermost position) is so chosen that the difference between opening and closing temperatures is somewhat less than the difference between the trip temperature of the device and the ordinary ambient temperature in which the motor and protector will be operated. When the reset button falls to its lowermost position, or when driven there by the circuit opening operation of the thermostat when the bimetal element 104 becomes heated, it permits the toggle 106 to carry the contact 122 such a great distance that a return to a normal temperature will not cause an automatic reclosing of the circuit. Furthermore, an actuation of the manual push button 120 cannot effect the reclosing of the circuit while the bimetal element 194 is still hot. Consequently the circuit can be reclosed only when both (1) the thermal protector has cooled through a substantial temperature drop, and (2) the push button 120 is actuated to "reset" the device to its closed circuit condition. Certain features herein shown and described are described and claimed in M. W. Eaton application Ser. No. 277,436, filed June 5, 1939.

The present invention is also suitable protection of apparatus against excessively low temperatures. For example, in the case of certain types of refrigerating machinery and also in the case of machines operating under extremely cold ambient conditions, there is danger of lubricating oil becoming so cold as to make continued operation dangerous. For protecting against low temperatures, the thermostats shown in Figs. 2 and 7 would be modified to open their contacts in response to a fall of temperature a predetermined amount below the normal condition. The contacts in opening would control the protected machine to interrupt its operation or otherwise protect it from damage.

It will be apparent to those skilled in the art that the present invention is not limited to the particular construction or mode of operation herein shown and described, but is capable of numerous modifications and variations. Accordingly, I intend that the invention be limited only in accordance with the scope of the appended claims.

I claim:

1. In combination, a snap acting thermostatic switch having a thermal actuating element and contacts opened and closed with a snap action thereby whereby the thermal element opens and closes those contacts at separate temperatures thereof, shiftable reset means on said thermostatic switch for changing the number of degrees difference between said separate temperatures, and means for limiting the shifting movement of said reset means to prevent the reduction of said number of degrees below a predetermined minimum, whereby said reset means is incapable of actuating said contacts when the temperature of said thermal element is outside a predetermined range.

2. In combination in a snap acting thermostatic switch, a moving contact, a stationary contact, a shiftable stop, a thermal actuator for moving said movable contact with a snap action from said shiftable stop to said stationary contact, and also for moving said movable contact away from said stationary contact, and means for limiting the motion of said shiftable stop towards said stationary contact for limiting the distance that said shiftable stop can carry the movable contact towards said stationary contact.

3. A temperature limiting thermostatic switch construction for an energy translating device, comprising a snap acting thermostatic switch in which the thermal element furnishes the energy for the snap movement of the contacts, a stop for limiting the snap motion of said thermostatic switch in responding to a rise of temperature said stop being shiftable to change the limit imposed on said snap motion, whereby said shiftable stop may be shifted to change the position from which said thermostatic switch must begin its snap motion in responding to a falling temperature so as to vary the return operating point, means for so limiting the shifting motion of said stop in one direction that the maximum value of said return operating point is substantially above normal atmospheric temperatures, but also substantially below the trip temperature, and for so limiting said shifting motion in the other direction that the minimum value of said return temperature is substantially below normal atmospheric temperatures, whereby when said stop is maintained in one of its limiting positions, said thermostatic switch resets automatically in response to the cooling of the energy translating device, but fails so to respond automatically when said stop is in its other limiting position.

4. In combination in a temperature limiting thermostatic switch for an energy translating device, contacts, a thermal actuating element arranged to actuate said contacts with a snap action both in response to a rise in temperature, and also in response to a fall in temperature, whereby the thermal element necessarily opens and closes those contacts at separate temperatures thereof, said thermostatic switch being so constructed and arranged that the number of degrees difference between those separate temperatures is greater than the difference between normal atmospheric temperatures and the "trip" temperature of said thermostatic switch in the translating device which it is adapted to protect, whereby said thermostatic switch, must of necessity fall to a temperature below normal atmospheric temperature in order to actuate said contacts in response to only a fall of temperature, and manually actuable means for shifting the parts of said thermostatic switch relative to each other to raise the lower operating temperature of said thermostatic switch, said thermostatic switch including means for limiting said shift of its parts to limit the number of degrees of shift of said lower operating temperature to a value less than the number of degrees between said normal atmospheric temperature and the trip temperature of said thermostatic switch.

5. In combination in a device of the class described, cooperating stationary and movable contacts, a thermal actuating element movable in response to temperature change, two elongated members constituting a toggle for supporting and carrying the movable contact, one of said elongated members being supported on and moved by said thermally responsive actuating element to actuate said toggle to move said contacts with a snap action, both in response to a fall of temperature and also in response to a rise of temperature, a shiftable stop for limiting the snap motion of said toggle when responding to a rise of temperature, and therefore for determining the position from which said toggle snaps when responding to a fall of temperature, whereby said shiftable stop is movable to alter the lower of the two operating temperatures of said device, and means for so limiting the motion of said shiftable stop that said shiftable stop is incapable of moving into such a position as would prevent said thermal element from actuating said toggle with a snap action in both directions of its operation.

6. The combination of claim 4 wherein the change in operating temperature of said thermostatic switch resulting from the shifting of said manually actuable means is less than the maximum difference between the two operating points of said thermostatic switch that can obtain in any shifted position of said manually actuable means.

7. In combination in a snap acting thermostatic switch, a movable contact, a stationary contact, a stop movable towards and away from said stationary contact to vary the spacing therebetween, a thermal actuator for moving said movable contact with a snap action between said stationary contact and movable stop, means for limiting the motion of said thermal actuator to prevent said thermal actuator from actuating said movable contact away from said stop when said stop lies at its greatest distance from said stationary contact, said thermotsatic switch being so constructed and arranged that a predetermined movement of said stop towards said stationary contact frees said thermal actuator from said obstruction and enables it to actuate said contact from said movable stop to said stationary contact.

8. In a device of the class described, a switch having cooperating stationary and movable contacts, said movable contact being mounted upon two movable supports and being adapted to operate upon predetermined movement of said supports relative to each other, and a stop member for said movable contact in the operated position of the same, said stop member being movable from a position in which said movable contact will return to the non-operated position thereof upon a predetermined return movement of said movable supports, to a position in which said movable contact will not return to the non-operated position thereof upon said predetermined return movement of said movable supports.

9. In combination in a device of the class described, cooperating stationary and movable switch contacts, a thermal element movable in response to temperature change, two elongated members constituting a toggle for supporting the movable contact, one of said elongated members being supported on and movable by said thermally responsive element to actuate said toggle to move said movable contacts with a snap action, a stop for limiting the motion of said movable contact, said stop being shiftable to reduce the permissible motion of said contact, for in turn reducing the movement required of said thermal actuator for inducing a snap action of said contact, and an obstruction for limiting the motion of said thermal member to prevent said thermal member from moving a sufficient distance to actuate said contact in one of its directions when said shiftable stop is in the position permitting maximum motion of said movable contact, said obstruction being so placed as to permit sufficient motion of said thermal member for actuating said contacts in both directions when said shiftable stop lies in its position of minimum contact motion.

ARTHUR L. RICHE.